(12) United States Patent
Ko et al.

(10) Patent No.: US 11,594,057 B1
(45) Date of Patent: *Feb. 28, 2023

(54) USING SERIAL MACHINE LEARNING MODELS TO EXTRACT DATA FROM ELECTRONIC DOCUMENTS

(71) Applicant: States Title, Inc., San Francisco, CA (US)

(72) Inventors: Allen Ko, Oakland, CA (US); Daniel Faddoul, San Francisco, CA (US); Andy Mahdavi, San Francisco, CA (US)

(73) Assignee: States Title, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/736,518

(22) Filed: May 4, 2022

Related U.S. Application Data

(63) Continuation of application No. 17/038,396, filed on Sep. 30, 2020, now Pat. No. 11,341,354.

(51) Int. Cl.
*G06K 9/62* (2022.01)
*G06V 30/414* (2022.01)
*G06N 20/20* (2019.01)
*G06V 30/18* (2022.01)

(52) U.S. Cl.
CPC ......... *G06V 30/414* (2022.01); *G06K 9/6262* (2013.01); *G06K 9/6269* (2013.01); *G06N 20/20* (2019.01); *G06V 30/18057* (2022.01)

(58) Field of Classification Search
None
See application file for complete search history.

(56) References Cited

U.S. PATENT DOCUMENTS

| | | | |
|---|---|---|---|
| 6,182,095 B1 | 1/2001 | Leymaster et al. | |
| 8,126,837 B2 | 2/2012 | Stollman | |
| 8,787,681 B1 | 7/2014 | Rubio | |
| 8,799,251 B2 | 8/2014 | McCormack et al. | |
| 9,576,272 B2 | 2/2017 | Macciola et al. | |
| 9,767,379 B2 | 9/2017 | Macciola et al. | |
| 10,691,937 B2 | 6/2020 | Hosabettu et al. | |
| 10,721,190 B2 * | 7/2020 | Zhao | G06K 9/6277 |
| 10,922,770 B2 | 2/2021 | Cook | |

(Continued)

FOREIGN PATENT DOCUMENTS

JP 2008165641 A * 7/2008

*Primary Examiner* — Feng Niu
(74) *Attorney, Agent, or Firm* — Fish & Richardson P.C.

(57) ABSTRACT

Methods, systems, and apparatus, including computer programs encoded on computer storage media, for machine learning. One of the methods includes receiving a document having a plurality of first text strings; extracting the plurality of first text strings from the document; providing the extracted plurality of first text strings to a first machine learning model, wherein the first machine learning model is trained to output a numerical vector representation for each input first text string; providing the output vector representations from the first machine learning model to a second machine learning model, wherein the second machine learning model is trained to output a second text string for each input vector representation; and processing the second text strings to generate an output.

21 Claims, 4 Drawing Sheets

(56) References Cited

U.S. PATENT DOCUMENTS

| | | | |
|---|---|---|---|
| 2007/0217715 A1* | 9/2007 | Newcomer | G06V 30/416 |
| | | | 382/305 |
| 2009/0327321 A1 | 12/2009 | McCormack et al. | |
| 2010/0074524 A1 | 3/2010 | Stollman | |
| 2010/0257108 A1* | 10/2010 | Skeels, IV | G06Q 50/163 |
| | | | 235/494 |
| 2010/0306148 A1* | 12/2010 | Johnston | G06F 40/247 |
| | | | 706/46 |
| 2013/0332374 A1 | 12/2013 | Hartnett | |
| 2015/0199567 A1* | 7/2015 | Fume | G06V 30/413 |
| | | | 382/187 |
| 2015/0324640 A1 | 11/2015 | Macciola et al. | |
| 2015/0347861 A1* | 12/2015 | Doepke | G06V 30/412 |
| | | | 382/199 |
| 2016/0239761 A1* | 8/2016 | Simard | G06F 16/951 |
| 2017/0169103 A1* | 6/2017 | Juneja | G06F 16/3346 |
| 2018/0293438 A1* | 10/2018 | Ortiz | G06F 16/583 |
| 2018/0293647 A1* | 10/2018 | Porter | G06F 40/103 |
| 2018/0329892 A1 | 11/2018 | Lubbers et al. | |
| 2018/0350065 A1 | 12/2018 | Nakano et al. | |
| 2018/0350069 A1 | 12/2018 | Nakano et al. | |
| 2019/0034801 A1 | 1/2019 | Sodhani et al. | |
| 2019/0180154 A1 | 6/2019 | Orlov et al. | |
| 2019/0215579 A1* | 7/2019 | Beckett | H04N 21/8126 |
| 2019/0251167 A1 | 8/2019 | Subbaraya et al. | |
| 2019/0333142 A1* | 10/2019 | Thomas | G06F 16/27 |
| 2019/0340428 A1* | 11/2019 | Wickett | H04L 51/18 |
| 2019/0384971 A1* | 12/2019 | Borodin | G06V 30/412 |
| 2019/0384973 A1* | 12/2019 | Suriyanarayanan | G06V 30/416 |
| 2020/0034611 A1 | 1/2020 | Hosabettu et al. | |
| 2020/0202040 A1* | 6/2020 | Johnson | G06F 16/22 |
| 2020/0311467 A1 | 10/2020 | Srivastava et al. | |
| 2020/0356363 A1 | 11/2020 | DeWitt et al. | |

* cited by examiner

USING SERIAL MACHINE LEARNING MODELS TO EXTRACT DATA FROM ELECTRONIC DOCUMENTS

CROSS-REFERENCE TO RELATED APPLICATION

This is a continuation of U.S. application Ser. No. 17/038,396, filed on Sep. 30, 2020, now U.S. Pat. No. 11,341,354, the disclosure of which is considered part of and is incorporated by reference in the disclosure of this application.

BACKGROUND

This specification relates to machine learning. Conventional machine learning models can be trained to generate a particular type of output from a given input. Typically, a machine learning model is trained using a collection of labeled training data. The machine learning model can be trained such that the model correctly labels the input training data. New data can then be input into the machine learning model to determine a corresponding label for the new data.

SUMMARY

Machine learning models can be used to identify data having a particular type. This specification describes a system that uses two machine learning models, of different types, in serial to process input data and generate output data corresponding to particular data types. In some implementations, the first machine learning model is a document to vector model that turns an input string of text characters into a particular vector of numbers that captures the semantic meaning of the input string. The second machine learning model can be a classification model. One or more vectors output from the first model can then be provided as input to the second machine learning model to transform the respective vectors into another text string having particular data type.

In general, one innovative aspect of the subject matter described in this specification can be embodied in methods that include the actions of receiving a document having a plurality of first text strings; extracting the plurality of first text strings from the document; providing the extracted plurality of first text strings to a first machine learning model, wherein the first machine learning model is trained to output a numerical vector representation for each input first text string; providing the output vector representations from the first machine learning model to a second machine learning model, wherein the second machine learning model is trained to output a second text string for each input vector representation; and processing the second text strings to generate an output.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. Using machine learning models eliminates the need for manual interpretation and input of data, which reduces the time needed to evaluate incoming data. Errors in transcription and in understating the correct data type conversion can be greatly reduced. Using machine learning models eliminates the need for manual interpretation and input of data that would otherwise require human interpretation and transcription. Errors in transcription and in mapping the data to the correct type can be greatly reduced. Time spent on interpretation and input of the data is also greatly reduced since the model is significantly faster than any human.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Overview

Figure 1:
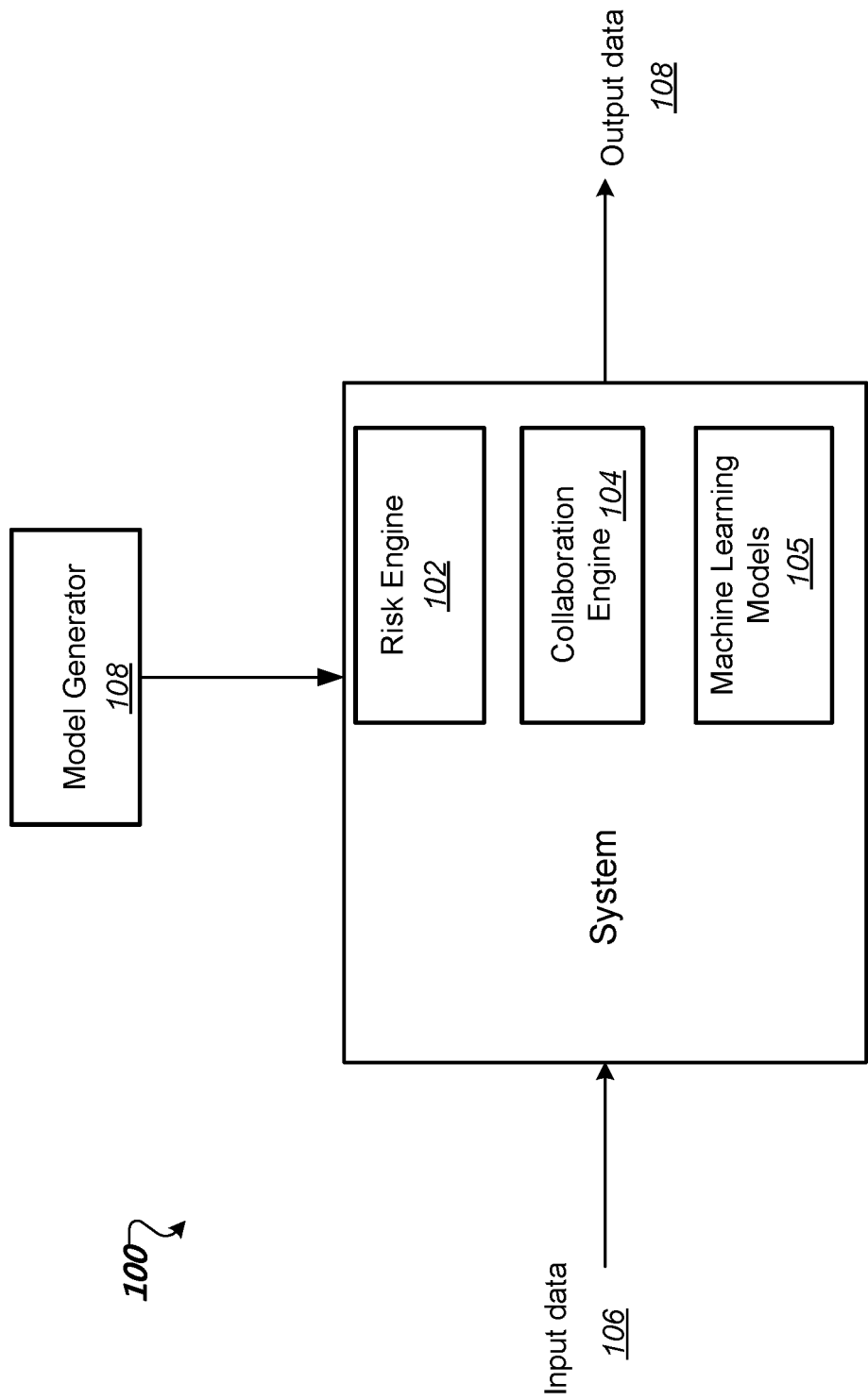
FIG. 1 is a block diagram of an example system.

Machine learning models can be used to identify data having a particular type. This specification describes a system that uses two machine learning models, of different types, in serial to process input data and generate output data corresponding to particular data types. In some implementations, the first machine learning model is a document to vector model that turns an input string of text characters into a particular vector of numbers that captures the semantic meaning of the input string. The second machine learning model can be a classification model which is designed to predict a particular output type from an input. One or more vectors output from the first model can then be provided as input to the second machine learning model to transform the respective vectors into another text string having a particular data type.

In some implementations, the serial machine learning models are part of a title production system for real property transactions. A title production system is used by title companies to manage workflows and work with various third parties involved in the transaction, e.g., lenders. During a typical real property transaction, there are a number of interactions between lenders and a title company. One of these interactions is a fee collaboration process to identify and align all of the fees associated with the transaction, e.g., to be paid on or around the closing date of the transaction, to ensure that both parties agree. Both parties agree on the fees by exchanging documents back and forth and entering them into their respective systems.

Conventionally, the fee collaboration process entails the lender providing a title company with a closing disclosure document, which is typically a document within a larger closing package. The closing disclosure, amongst other things, lists out each fee associated with the transaction. Additionally, lender systems are typically not integrated with title company's systems. As a result, information cannot be directly exchanged between lenders and title companies. Instead, documents sent from the lender, e.g., as a portable document format (PDF) document, are manually processed by title company operators into the title production system. This manual processing often introduces errors including incorrect fee identification and transcription errors. This can delay the transaction.

While the closing disclosure form is a standardized document, different lenders use different terminology to describe the various fees, which in turn may be different from the terminology used by the title production system of the title company. For example, a lender may reference a "notary fee" while the corresponding fee in the title production system is a "recording fee." Consequently, workers have to take the information from the received closing disclosure, determine the corresponding fee in the title production system, and input that into their title company's title production system using the corresponding terminology. This can be error prone both in terms of manual data entry errors as well as errors in assigning the correct fee based on the differing terminology.

This specification describes a system for fee collaboration in which the fee information can be extracted from a closing package and semantically understood so that they can be automatically entered into the title production system.

FIG. 1 is an example system 100. The system 100 can be (or be part of) a title production system. The title production system includes a number of components including a risk evaluation engine 102, a fee collaboration engine 104, and machine learning modules 105. In particular, the risk evaluation engine 102 and fee collaboration engine 104 can use one or more of the machine learning modules 105 to perform their respective operations. The machine learning models 105 can be generated by model generator 108. The model generator 108 uses training data to train a model designed to generate a particular prediction based on input data, as described in greater detail below with respect to FIG. 2.

The system 100 receives data 106. The data can include, for example, property data and transaction data. The property data can include information on particular parcels of real property involved in a transaction including a title history, the parties of the transaction, and any encumbrances, e.g., mortgages or liens, on the parcel. The transaction data can include information about the transaction including a loan amount and fees associated with the transaction, e.g., as part of a closing disclosure.

The risk evaluation engine 102 can use the property data to generate one or more risk scores that are used to predict a risk of a title defect. In an automated title production system, one or more machine learning models can be used to generate a title risk value.

The fee collaboration engine 104 uses the transaction data to extract and process fee information, for example, to generate a settlement document to return to lenders. The fee collaboration engine 104 can use machine learning models to identify the fees as described in greater detail below.

Based on the various components, the system 100 can generate outputs 108 that are used to facilitate closing of the real estate transaction and issue a title insurance policy.

Training Machine Learning Models for Serial Use

Figure 2:
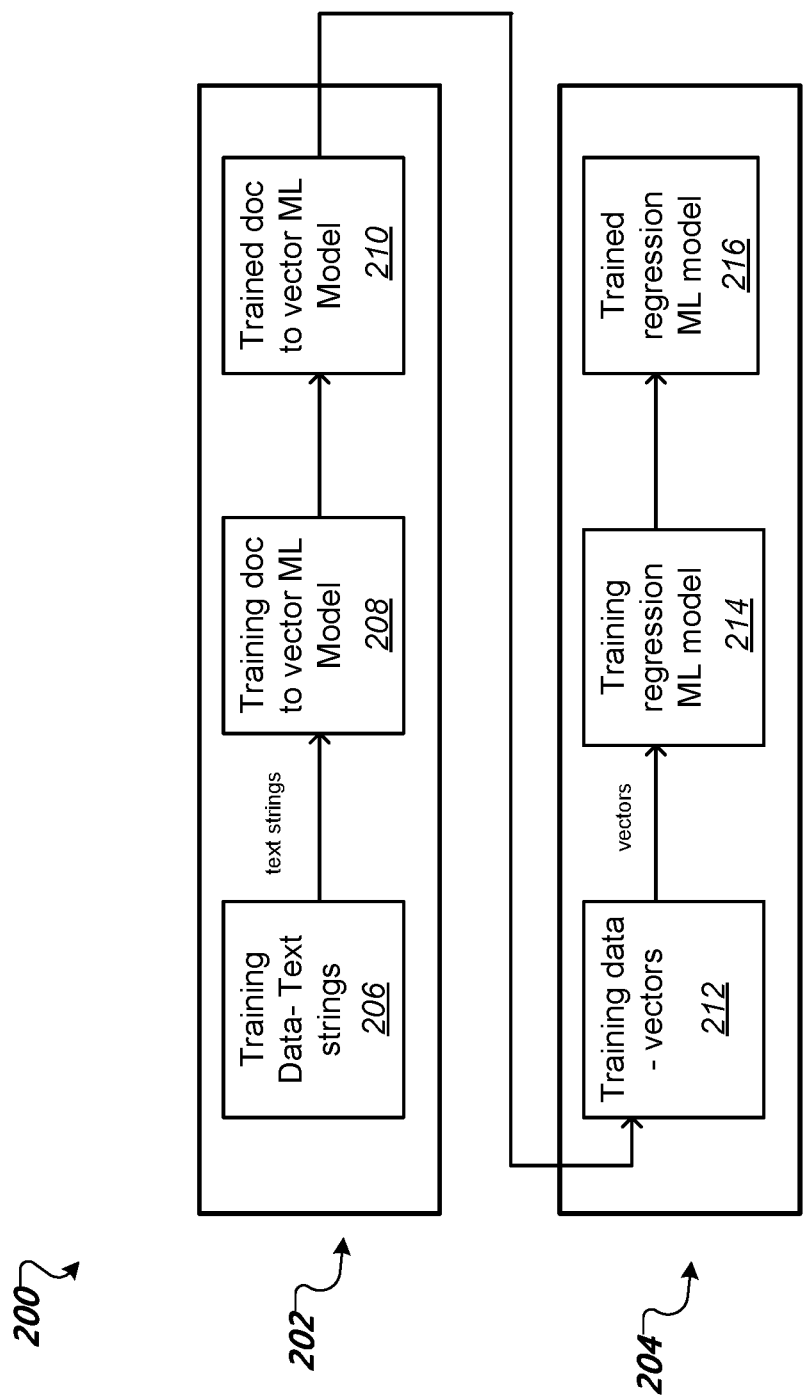
FIG. 2 is a diagram illustrating an example training of machine learning models.

FIG. 2 is a diagram 200 illustrating a training of a pair of machine learning models operating in combination. In particular, FIG. 2 shows a first flow 202 for generating a first machine learning model and a second flow 204 for generating a second machine learning model.

In the first flow 202, training data 206 is input to a training system 208. The training system uses a particular machine learning algorithm to learn particular outputs from the training data 206. The training data is a collection of data collected from one or more sources. In the context of fee collaboration, the training data 206 can be a collection of loan documents from many different real estate transactions. For example, the training data 206 can be a collection of closing disclosures generated by different lenders as a part of a historical collection of transaction data. The closing disclosures include various fees using the terminology of those particular lenders. Thus, the same fee types are likely represented by multiple text variation in the training set.

One type of machine learning model is document to vector model, which, when trained, generates an output vector that provides a numerical representation of an input document. In particular, the resulting vector captures the meaning of the input document. Training the document to vector model 208 is typically an unsupervised learning process that iteratively processes the training data according to the particular training algorithm until a stopping point has been reached and the model has been trained 210.

In some implementations, the document to vector model is a neural network model. A neural network is a machine learning model that employs one or more layers of non-linear units to predict an output for a received input. Some neural networks are deep neural networks that include one or more hidden layers in addition to an output layer. The output of each hidden layer is used as input to another layer in the network, i.e., another hidden layer, the output layer, or both. Some layers of the neural network generate an output from a received input and a respective set of parameters, while other layers of the neural network may not have parameters.

Parameters can include at least one or more of the following: how many layers should be processed, corresponding sets of weight inputs for each layer of the multiple layers, an initial set of activation inputs, i.e., the input to the neural network from which the interference is to be computed, corresponding input and output sizes of each layer, a stride value for the neural network computation, and a type of layer to be processed, e.g., a convolutional layer or a fully connected layer.

The output layer produces a vector representation of the document input. In some implementations, the output is represented as a vector that is binarized. Binarizing can be used to save space and make computations more efficient.

This training set of loan documents is then used to train the document to vector model 208. Training the document to vector model 208 uses the locations of words in the training set to learn where words tend to appear. In particular, the document to vector model 208 uses the location of words next to each other, and words collected in the same document. Based on this, the model learns some degree of semantic meaning of both words and documents. Thus, for a given set of input documents, the document to vector model generates corresponding vector representations representing semantic meanings of the contents of the documents.

The trained document to vector model 210 can be used to generate a collection of vectors either from the training data, another corpus of data, or combination of both. The resulting collection of vectors can be used as the training data 212 for the second machine learning model.

The training data 212 for the second machine learning model is used to train 214 a different type of machine learning model, for example, a classification model. The classification model is trained according to a different training algorithm, for example, a regression algorithm, to identify relationships between particular outcome variables and one or more features. In particular, the training process of the classification model is to learn values for particular model parameters so that, for a given input vector, a corresponding output variable is identified.

In particular, the second machine learning model 216 shown in FIG. 2 is be trained to determine a fee type based on the various vectors of the training data generated by the first machine learning model 210. Once trained, the second machine learning model 216 can receive an input vector and output a corresponding value.

Returning to the context of fee collaboration, the vectors represent the meanings of the various fee descriptions from the collection of closing disclosures. The goal of the second model is to determine a fee type, using the fee descriptions that have been vectorized by the first model. The title production system may use a specific set of terminology for the various fees types. In the context of fee collaboration, this model is predicting from the set of possible fee types. For a given input vector, the model identifies the corresponding fee type output for that vector. Thus, the combination of models allows for an input fee description, e.g., "application fee to Acme Bank" to be classified as having the fee type "Loan Application Fee."

As a result, various different phrasings for a particular fee can be mapped to a vector embodying the semantic meaning for that fee, which can then be mapped to a canonical fee type set used by the title production system. Furthermore, the correct fee types can be determined without human intervention.

In some implementations, after training our machine learning models, thresholds are set to enable intelligent handling of any anomalous fee descriptions, including errors in the input documents e.g., misspellings of fee descriptions. One way to set the thresholds is by comparing machine classifications and confidence scores with their expected truth values. This allows the system to measure the accuracy of the machine classifications, as well as set a threshold for machine confidence for a given accuracy. This confidence threshold is designed to catch errors in fee descriptions, and route erroneous fee descriptions for human interpretation.

Figure 3:
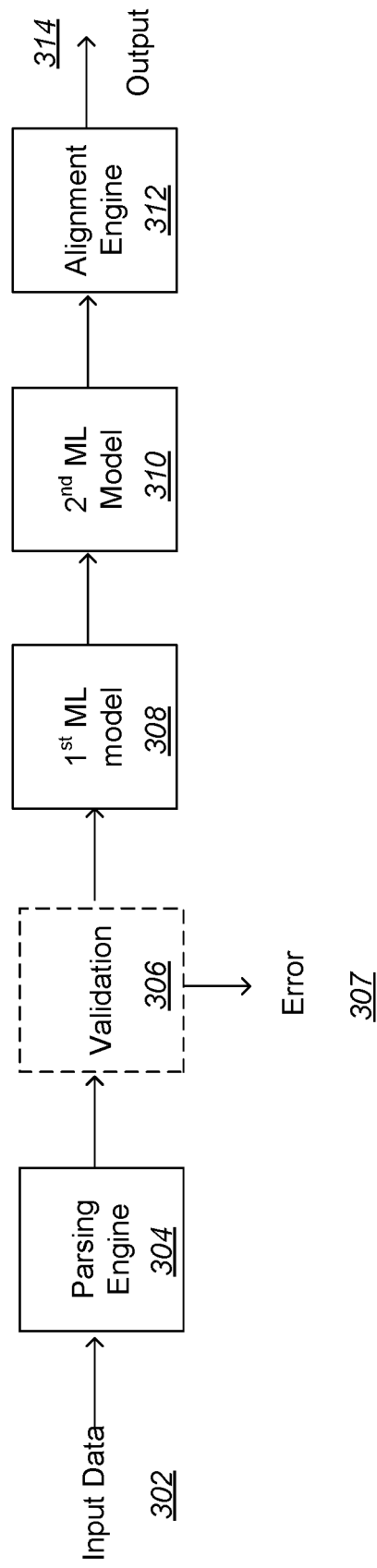
FIG. 3 is a diagram illustrating an example data processing system using serial machine learning models.

Serial Application of the Machine Learning Models to Generate an Output from Input Data FIG. 3 is a diagram 300 illustrating a data processing system using serial machine learning models in serial. In particular, FIG. 3 illustrates a process for taking particular input data and generating particular output data using a first and second machine learning models, trained, for example, as described above with respect to FIG. 2.

Input data 302 is provided as input to a parsing engine 304. The parsing engine is configured to extract particular types of information from the input data. For example, the input data can be a document and the parsing engine 304 can be configured to extract particular text strings from the document. This can include identifying a particular portion of the document, for example, based on the document structure, and extracting particular text strings from this portion. For example, the particular portion can have a standardized format, e.g., a particular layout, that can be recognized by the parsing engine. Extracting the text strings can include identifying rows of text in the particular portion, performing a suitable optical character recognition technique on the row of text, and outputting a corresponding recognized text string.

A validation engine 306 optionally performs a validation operation on the extracted text strings. For example, an additional text string can be extracted that corresponds to a known data value, e.g., as a control value. In some implementations, the document includes the additional text string in a known standardized location. The validation engine 306 can compare the additional text string to the control value. If there is a match, the process can continue. However, if there is not a match, the process can abort and an error notification 307 can be generated. For example, the system can generate an error notification that identifies the respective string values that do not match.

The extracted text strings, after passing validation, or if validation is not performed, are input to a first machine learning model 308. The first machine learning model 308 can be a document to vector model as described above with respect to FIG. 2. The first machine learning model 308 receives the texts strings as input and outputs a vector representation for each text string.

The vectors output by the first machine learning model 308 are input to a second machine learning model 310. The second machine learning model 310 can be a classification model as described above with respect to FIG. 2. The second machine learning model 310 outputs, for each input vector, a data output. The data output has a particular relationship to the meaning of the corresponding input text string represented by the vector. The data output can correspond to one of a specified set of outputs corresponding to an objective of the data processing system.

The data output can be provided to an alignment engine 312. The alignment engine 312 incorporates the data output into one or more data structures for generating one or more outputs 314. For example, the data output can be compared to other values to determine a match. In another example the alignment engine 312 generates a document using the descriptions defined by the data output, which can then be output 314. In some other implementations, errors can be output 314 based on the results of the alignment process.

Fee Collaboration Process

Figure 4:
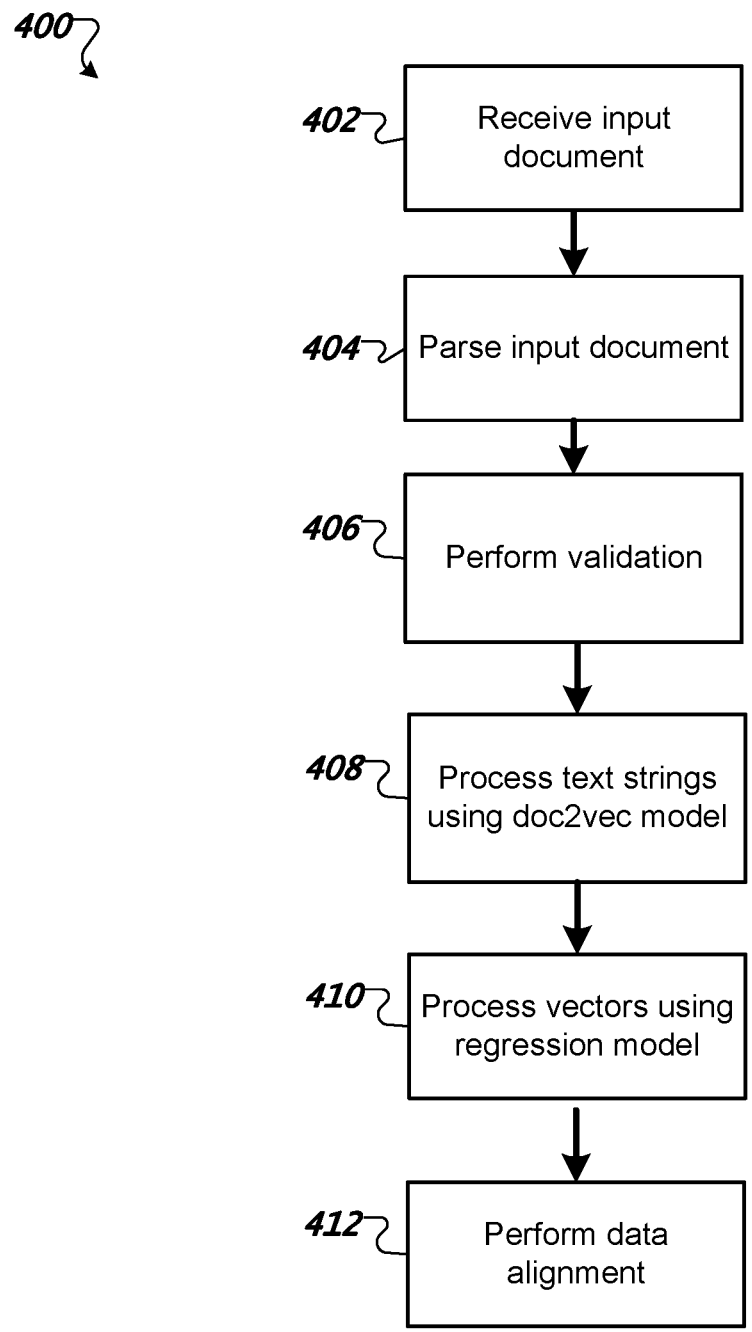
FIG. 4 is a flow diagram of an example process for extracting particular data types from a document.
Like reference numbers and designations in the various drawings indicate like elements.

FIG. 4 is a flow diagram of an example process 400 for using serial machine learning models in a fee collaboration process. For convenience, the process 400 will be described as being performed by a system of one or more computers, located in one or more locations, and programmed appropriately in accordance with this specification. For example, fee collaboration engine 104 of the title production system 100 of FIG. 1, appropriately programmed, can perform at least part of the process 400.

The system receives an input document (step 402). The input document can be a closing package containing many different documents related to a real estate transaction including a closing disclosure document. In some other implementations, the input document is just the closing disclosure document. The input document can be a single file of a suitable format, for example, a PDF document.

The system parses the input document (step 402). The system parses the input document to identify the closing disclosure and to extract individual text strings corresponding to fees listed in the closing disclosure.

Parsing the input document can include identifying the closing disclosures from amongst the contents of the closing package. For example, the closing disclosure has a standardized structure. This structure can be used to identify the specific pages of the document corresponding to the closing disclosure.

Parsing the input document further includes extracting text strings from the closing disclosure. The text string can correspond to individually listed fees and their corresponding values. The fees can include, for example, a notary fee, a credit report fee, an insurance fee, etc. In some implementations, there are about 15 different fee types that can appear in a closing disclosure. Not all possible fees are preset in each transaction. Additionally, the descriptions of each fee can vary between closing disclosure documents.

Extracting the individual fee information can include identifying rows of text in the particular portion, performing a suitable optical character recognition technique on the row of text, and outputting a corresponding text string which includes a fee description string. The corresponding monetary values for each fee are also extracted. These values are retained to latter be matched with the respective output classifications of the machine learning models.

The system optionally performs a validation step before processing the extracted fees (step 406). For example, the closing disclosure can include a value representing a loan amount. Many of the fees are calculated based on the loan amount. Therefore, the loan amount in the closing disclosure should match the loan amount of the title production system. If they do not match, then the extracted fees will likely not match what is expected by the title production system. Moreover, the loan amount can change one or more times during a transaction. A change may not have been conveyed to the title company. Therefore, the title production system may be working off of outdated information.

As a result, the parsing can also include extracting the loan amount value from the closing disclosure. Given the standardized form of the closing disclosure, the system can identify the string corresponding to the loan value based on the structure of the document. For example, the loan amount may appear at a particular location of the closing disclosure and the system can extract a numerical string at that location. The system can then compare the value extracted from the closing disclosure with an expected loan amount in the title production system (e.g., from a prior interaction with the lender on the same transaction).

If the loan amounts match, the system can continue to process the extracted fee descriptions. If the loan amounts do not match, the system can end the processing and generate an error notification for an operator to evaluate. For example, the error notification can provide the two loan values from each source for follow up by a human operator. If the operator can confirm the closing disclosure value is correct, the loan value can be updated in the system and the closing disclosure can be processed. In some implementations, the validation is performed on an extracted loan amount prior to extracting the fee descriptions from the closing disclosure.

The system processes the text strings, each corresponding to a particular fee description, using a document to vector machine learning model (step 408). The document to vector machine learning model has been trained to take input text strings and output a vector representation of the meaning of the text string, for example, as described above with respect to FIG. 2. In this example, the document to vector machine learning model takes each text string corresponding to a particular extracted fee description and outputs a vector representing the meaning of that fee description.

The resulting vector representations of the fee descriptions can then be used as input to a second machine learning model. In particular, the system inputs the vector representations generated by the document to vector machine learning model to a classification machine learning model (step 410). The classification model, for example a regression model, is configured to associate vector representations to the fee types used by the title production system as output variables. Thus, even though different terminology can be used for the various fee types in the closing disclosure, the fees listed in the closing disclosure can be matched to a specific set of fee types used by the title production system. The classification model outputs a prediction of a corresponding fee type for each input vector representation. Thus, for a given workflow, the system takes a lender fee description, converts it into a vector representation, and converts that vector representation into a fee type of the title production system. The predicted fee type can further include a confidence of other value indicating how likely the fee description is of the predicted type. In some cases, the confidence need satisfy one or more thresholds. If the one or more thresholds are not satisfied, the fee description can be flagged for human evaluation.

The system performs data alignment using the output fee descriptions (step 412). Data alignment can include inputting the fee descriptions to the title production system along with the corresponding fee amounts original parsed from the closing disclosure. In some implementations, these fee values are compared to prior values for the same fees in the system to identify any discrepancies. In some other implementations, the input fee descriptions and values are used to generate a settlement document that is then returned to the lender. This settlement document can be used to confirm that the fee amounts are in alignment for both the lender and the title company.

In some alternative implementations, in addition to aligning fees, additional information can be extracted from inside the fee descriptions. For example, payment partner information can be nested within a particular fee description such as "Appraisal Fee to Sample Company Inc." In such a situation, the name "Sample Company Inc." can be extracted from the fee description. This can help ensure that funds are distributed to the correct party and can save additional manual work needed to input payment partner information while increasing data input accuracy.

Fee collaboration is also used as a key component in quality checking a loan package. Verifying that all of the information inside a lengthy loan package (e.g., 100+ pages) is a vital step in title and escrow. Using automated fee collaboration to find, extract, understand, and verify the fees is key to enabling overall automated document quality checking of loan packages.

In some other implementations, similar techniques can be used to tag other kinds of documents beyond fee types. For example, the machine learning models can be used to covert text from other documents into a document vector and run a classification over it to tag a document of a particular type.

The present specification describes unconventional steps to solve problems associated with fee collaboration that are distinct from the conventional approach. In particular, errors in fee collaboration can be greatly reduced from manual operations. The correct fee descriptions can be identified with greater confidence. Using a pair of machine learning models in series improves the functions of the system by allowing for the efficient evaluation of text strings into corresponding descriptions by understanding the meaning behind the text strings and mapping those meanings back into correct fee descriptions.

An electronic document, which for brevity will simply be referred to as a document, may, but need not, correspond to a file. A document may be stored in a portion of a file that holds other documents, in a single file dedicated to the document in question, or in multiple coordinated files.

In this specification, the term "database" will be used broadly to refer to any collection of data: the data does not need to be structured in any particular way, or structured at all, and it can be stored on storage devices in one or more locations.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving a document having a plurality of first text strings each representing a respective description related to a real estate transaction, wherein each first text string has a corresponding value;
   extracting the plurality of first text strings from the document;
   providing the extracted plurality of first text strings to a first machine learning model, wherein the first machine learning model is trained to output a numerical vector representation for each input first text string, wherein each vector representation represents a meaning of the corresponding description;
   providing the output vector representations from the first machine learning model to a second machine learning model, wherein the second machine learning model is trained to output a second text string representing a respective title production system description related to the real estate transaction for each input vector representation such that for each description corresponding to an input first text string a corresponding title production system description is output; and
   processing the second text strings to generate an output including associating the value for each first text string with the corresponding second text string.

2. The method of claim 1, wherein the first machine learning model is a document to vector model trained using a collection of text strings to generate numerical vectors that represent the meaning of the text strings.

3. The method of claim 2, wherein the second machine learning model is a classification model trained using a collection of vectors generated by the first machine learning model to generate a prediction that the vector corresponds to a particular title production system description of a set of title production system descriptions.

4. The method of claim 1, wherein generating an output comprises:
   comparing values associated with the second text strings with stored values; and
   in response to determining one or more values that do not match, generating an error notification.

5. The method of claim 1, wherein generating an output comprises:
   inserting the second text strings into a second document;
   inserting corresponding values for each of the second text strings and extracted from the received document into the second document; and
   providing the second document to a sender of the received document.

6. The method of claim 1, comprising, validating the values corresponding to the respective descriptions of the plurality of first text strings in the document, the validating comprising comparing a control value extracted from the document and associated with the real estate transaction with a corresponding stored value.

7. The method of claim 1, wherein generating the output comprises generating one or more fee descriptions of a title production system corresponding to the first text strings, and wherein the method further comprises performing data alignment comparing values associated with the fee descriptions with stored values for the same fee descriptions in the title production system for the real estate transaction.

8. A system comprising:
   one or more computers and one or more storage devices storing instructions that are operable, when executed by the one or more computers, to cause the one or more computers to perform operations comprising:
   receiving a document having a plurality of first text strings each representing a respective description related to a real estate transaction, wherein each first text string has a corresponding value;

extracting the plurality of first text strings from the document;

providing the extracted plurality of first text strings to a first machine learning model, wherein the first machine learning model is trained to output a numerical vector representation for each input first text string, wherein each vector representation represents a meaning of the corresponding description;

providing the output vector representations from the first machine learning model to a second machine learning model, wherein the second machine learning model is trained to output a second text string representing a respective title production system description related to the real estate transaction for each input vector representation such that for each description corresponding to an input first text string a corresponding title production system description is output; and processing the second text strings to generate an output including associating the value for each first text string with the corresponding second text string.

9. The system of claim 8, wherein the first machine learning model is a document to vector model trained using a collection of text strings to generate numerical vectors that represent the meaning of the text strings.

10. The system of claim 9, wherein the second machine learning model is a classification model trained using a collection of vectors generated by the first machine learning model to generate a prediction that the vector corresponds to a particular title production system description of a set of title production system descriptions.

11. The system of claim 8, wherein generating an output comprises:

comparing values associated with the second text strings with stored values; and in response to determining one or more values that do not match, generating an error notification.

12. The system of claim 8, wherein generating an output comprises:

inserting the second text strings into a second document;

inserting corresponding values for each of the second text strings and extracted from the received document into the second document; and providing the second document to a sender of the received document.

13. The system of claim 8, comprising, validating the values corresponding to the respective descriptions of the plurality of first text strings in the document, the validating comprising comparing a control value extracted from the document and associated with the real estate transaction with a corresponding stored value.

14. The system of claim 8, wherein generating the output comprises generating one or more fee descriptions of a title production system corresponding to the first text strings, and wherein the operations further comprise performing data alignment comparing values associated with the fee descriptions with stored values for the same fee descriptions in the title production system for the real estate transaction.

15. One or more non-transitory computer storage media encoded with computer program instructions that when executed by one or more computers cause the one or more computers to perform operations comprising:

receiving a document having a plurality of first text strings each representing a respective description related to a real estate transaction, wherein each first text string has a corresponding value;

extracting the plurality of first text strings from the document;

providing the extracted plurality of first text strings to a first machine learning model, wherein the first machine learning model is trained to output a numerical vector representation for each input first text string, wherein each vector representation represents a meaning of the corresponding description;

providing the output vector representations from the first machine learning model to a second machine learning model, wherein the second machine learning model is trained to output a second text string representing a respective title production system description related to the real estate transaction for each input vector representation such that for each description corresponding to an input first text string a corresponding title production system description is output; and processing the second text strings to generate an output including associating the value for each first text string with the corresponding second text string.

16. The non-transitory computer storage media of claim 15, wherein the first machine learning model is a document to vector model trained using a collection of text strings to generate numerical vectors that represent the meaning of the text strings.

17. The non-transitory computer storage media of claim 16, wherein the second machine learning model is a classification model trained using a collection of vectors generated by the first machine learning model to generate a prediction that the vector corresponds to a particular title production system description of a set of title production system descriptions.

18. The non-transitory computer storage media of claim 15, wherein generating an output comprises:

comparing values associated with the second text strings with stored values; and in response to determining one or more values that do not match, generating an error notification.

19. The non-transitory computer storage media of claim 15, wherein generating an output comprises:

inserting the second text strings into a second document;

inserting corresponding values for each of the second text strings and extracted from the received document into the second document; and providing the second document to a sender of the received document.

20. The non-transitory computer storage media of claim 15, comprising, validating the values corresponding to the respective descriptions of the plurality of first text strings in the document, the validating comprising comparing a control value extracted from the document and associated with the real estate transaction with a corresponding stored value.

21. The non-transitory computer storage media of claim 15, wherein generating the output comprises generating one or more fee descriptions of a title production system corresponding to the first text strings, and wherein the operations further comprise performing data alignment comparing values associated with the fee descriptions with stored values for the same fee descriptions in the title production system for the real estate transaction.

* * * * *